(12) United States Patent
Setty et al.

(10) Patent No.: US 10,291,592 B2
(45) Date of Patent: May 14, 2019

(54) SECURE ELECTRONIC COMMUNICATION

(71) Applicant: Microsoft Technology Licensing, LLC, Redmond, WA (US)

(72) Inventors: Srinath Tumkur Venkatacha Setty, Redmond, WA (US); Sebastian G. Angel, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/295,493

(22) Filed: Oct. 17, 2016

(65) Prior Publication Data

US 2018/0109500 A1    Apr. 19, 2018

(51) Int. Cl.
*H04L 29/06* (2006.01)
*H04L 12/58* (2006.01)
*G06F 17/30* (2006.01)

(52) U.S. Cl.
CPC .... *H04L 63/0428* (2013.01); *G06F 17/30864* (2013.01); *H04L 51/22* (2013.01)

(58) Field of Classification Search
CPC ............. H04L 63/0428; G06F 17/30864
USPC .......................................................... 713/170
See application file for complete search history.

(56) References Cited

U.S. PATENT DOCUMENTS

| | | | |
|---|---|---|---|
| 6,438,554 B1 | 8/2002 | Di-Crescenzo et al. |
| 6,496,867 B1 | 12/2002 | Beser et al. |
| 6,529,948 B1 | 3/2003 | Bowman-Amuah |
| 7,013,295 B2 | 3/2006 | Jakobsson et al. |
| 8,825,063 B2 | 9/2014 | Zhao et al. |
| 8,972,612 B2 | 3/2015 | Le et al. |
| 9,014,661 B2 | 4/2015 | deCharms |
| 9,141,824 B2 | 9/2015 | Olumofin |
| 9,313,179 B1 | 4/2016 | Yung et al. |
| 9,846,596 B1 | 12/2017 | Nogin et al. |
| 9,973,481 B1 * | 5/2018 | Sharifi Mehr ........ H04L 63/061 |
| 2002/0025043 A1 | 2/2002 | Feng et al. |
| 2007/0043729 A1 | 2/2007 | Kevenaar |
| 2008/0109448 A1 | 5/2008 | Aboel-nil et al. |
| 2009/0190752 A1 | 7/2009 | Ramzan et al. |
| 2009/0260060 A1 | 10/2009 | Smith et al. |
| 2009/0327703 A1 | 12/2009 | Feudo et al. |
| 2010/0002882 A1 | 1/2010 | Rieger et al. |

(Continued)

FOREIGN PATENT DOCUMENTS

| | | |
|---|---|---|
| EP | 2365669 A1 | 9/2011 |
| WO | 2016032503 A1 | 3/2016 |

OTHER PUBLICATIONS

Tang, et al., "Ensuring Security and Privacy Preservation for Cloud Data Services", In Journal of ACM Computing Surveys, vol. 49, No. 1, Jun. 2016, 39 pages.

(Continued)

*Primary Examiner* — Anthony D Brown (57) ABSTRACT

Techniques are disclosed for secure electronic communication. Examples of metadata include identification of a relationship of a sender and receiver, timing of a communication between the sender and receiver, and frequency of communication between the sender and receiver. The described techniques, for instance, may be implemented to allow a user device to request delivery from a server of an electronic communication and receive the electronic communication without the server being aware of which electronic communication was received.

20 Claims, 9 Drawing Sheets

(56) References Cited

U.S. PATENT DOCUMENTS

| | | |
|---|---|---|
| 2011/0191584 A1 | 8/2011 | Trostle et al. |
| 2011/0197058 A1 | 8/2011 | Mayer et al. |
| 2013/0173917 A1 | 7/2013 | Clifton et al. |
| 2013/0191650 A1 | 7/2013 | Balakrishnan et al. |
| 2013/0246813 A1 | 9/2013 | Mori et al. |
| 2014/0189364 A1 | 7/2014 | Kolesnikov |
| 2015/0019877 A1 | 1/2015 | Dayka et al. |
| 2016/0182222 A1* | 6/2016 | Rane .................. H04L 9/008 713/168 |

OTHER PUBLICATIONS

Lee, Micah, "Chatting in Secret While We're All Being Watched", Published on: Jul. 15, 2015 Available at: https://theintercept.com/2015/07/14/communicating-secret-watched/.

Gertner et al., "Protecting Data Privacy in Private Information Retrieval Schemes," In Proceedings of the thirtieth annual ACM symposium on Theory of computing, May 23, 1998, pp. 151-160.

"Non Final Office Action Issued in U.S. Appl. No. 15/295,608", dated Dec. 18, 2018, 12 Pages.

\* cited by examiner

SECURE ELECTRONIC COMMUNICATION

BACKGROUND

Keeping communication private has become increasing important in an era of mass surveillance and cyberattacks. For example, government officials and business leaders travel to hostile locations and risk revealing confidential information when they rely on local, untrusted infrastructure to communicate using mobile devices and computers. Additionally, even in friendly locations, servers and internet service providers may be untrusted. Many people are also concerned that communication is being monitored by private parties and government agencies. Not only are people concerned with content of communication being discovered, but metadata surrounding the communication as well. Metadata may contain information about the communication including identities of parties that sent and received the communication, a time of the communication, and a frequency of the communication. Although communication may be encrypted to protect content of the communication, maintaining privacy of associated metadata is an increasingly important challenge.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are disclosed for secure electronic communication such that they may protect data, including metadata, associated with the secure communication. Examples of metadata include identification of a relationship of a sender and receiver, timing of a communication between the sender and receiver, and frequency of communication between the sender and receiver. The described techniques, for instance, may be implemented to allow a user device to request delivery from a server of an electronic communication and receive the electronic communication without the server being aware of which electronic communication was received. The described techniques may be implemented to protect metadata even when all entities orchestrating the communication (e.g., internet service providers, proxy servers, DNS, etc.) are untrusted and controlled by a single entity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional methods of electronic communication rely on data encryption to protect content of the electronic communication. Although encrypting the content of electronic communication is important, it may also be important to protect metadata surrounding the electronic communication relating to identification of a relationship of a sender and receiver, timing of a communication between the sender and receiver, and frequency of communication between the sender and receiver. Some attempts to securely communicate while protecting metadata rely on a trusted internet service providers (ISP) or proxy server to protect the metadata. However, when a trusted server is not accessible, metadata may not be protected. Additionally, governments and other parties may force a trusted ISP or proxy server to reveal the protected metadata, thus reducing confidence in relying on an ISP or proxy server to protect communication metadata.

Techniques are described to securely exchange electronic communication and protect metadata surrounding the electronic communication. Examples of metadata include data relating to identification of a relationship of a sender and receiver, timing of a communication between the sender and receiver, frequency of communication between the sender and receiver, and so forth. This may be accomplished using a private information retrieval scheme such that a receiver device is able to locate and retrieve electronic communication from a server without the server knowing which electronic communication was located and retrieved.

In an example implementation, a first user device sends an encrypted message identified by a label to a server and for receipt by a second user device. The label is used to identify the encrypted message so that the encrypted message is retrievable by an intended recipient of the encrypted message. In comparison with conventional communications of messages where a massage is identified with one or more of a sender or an intended recipient, using a label does not communicate an identity of the intended recipient. The server then stores the encrypted message in a mailbox having a corresponding label. To facilitate efficient and private querying by the second user device attempting to find a mailbox storing an encrypted message on a server having a plurality of mailboxes, the plurality of mailboxes is stored on the server and indexed based on labels. In at least some implementations, a query for mailbox location includes a series of probes attempting to find a target mailbox using the index based on mailbox labels. Such a probe may use a private information retrieval protocol (discussed below) to avoid leaking to the server an identity of a probed mailbox. Continuing to probe after the indexed location of the target mailbox has been found may be helpful in protecting metadata by preventing the server from determining which encrypted message the second user device is attempting to locate.

According to various implementations, after determining an indexed location of a target mailbox storing an encrypted message, the second user device sends to the server a query vector, a form of a query matrix, being configured with encrypted entries that encrypt to zero at all entries except for a location corresponding to the targeted mailbox. This query vector generation process uses an encryption system that is additively homomorphic. That is, the encryption system allows the server to perform an operation on two ciphertexts (e.g., Enc(a) and Enc(b)) to obtain a ciphertext that corresponds to the sum of those encrypted values Enc(a+b). Furthermore, such an encryption system allows computing Enc(c*a) starting with c and Enc(a) via repeated addition of Enc(a) with itself c times, enabling the computation of a dot product between an encrypted vector and a plaintext vector. Thus, the query vector is configured such that when a dot product of the query vector and the index of the plurality of mailboxes is performed, content of the mailboxes with the exception of the targeted mailbox is filtered. To facilitate performing the dot product, the query vector may be one of a column vector or a row vector and the index may be expressed as the other of the row vector or the column vector. The server performs the dot product and the result of the dot product is delivered to the second user device including the targeted encrypted message. Thus, the encrypted message is delivered to the second user device while protecting metadata surrounding the electronic communication.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that may be employed to perform various techniques described herein.

Example Environment

Figure 1:
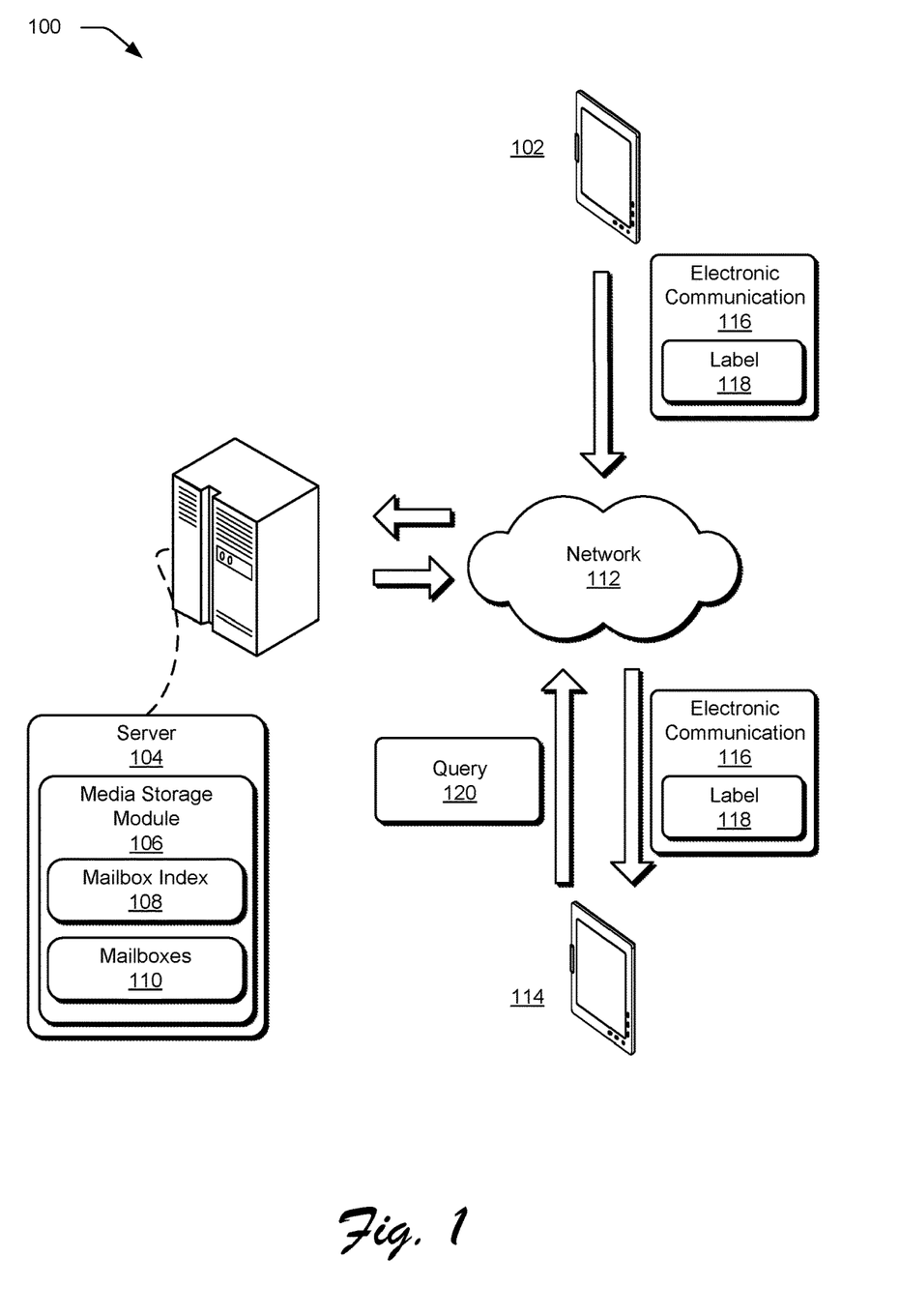
FIG. 1 is an illustration of an example environment in accordance with one or more implementations.

FIG. 1 illustrates an environment 100 in an example implementation that is operable to employ the techniques as described herein to protect metadata for secure communications. The illustrated environment 100 includes a computing device 102 for creating or selecting media content for sending as a secure communication to a server 104. By way of example, and not limitation, the computing device 102 may be a mobile phone, a personal computer, a wearable smart device, or as illustrated, a tablet computing device.

The server 104 includes a media storage module 106 for storing a mailbox index 108 and mailboxes 110 for storing media content received from computing devices such as the computing device 102. The server 104 is configured to communicate over a network 112 with the computing device 102 and a different computing device 114. The computing device 114 is a recipient of an electronic communication 116 identified by a label 118. Generally, the label 118 represents a data value that is appended to and/or included with the electronic communication 116, and that is used to identify the electronic communication 116. Accordingly, the electronic communication is generated or selected by the computing device 102 and sent, along with the label 118 to the server 104. The label may be derived from a known secret shared between computing devices 102 and 114 prior to assigning the label to a target mailbox. The computing device 114 is configured to retrieve the electronic communication 116 from the server 104 using a private information retrieval scheme. The private information retrieval scheme, for instance, includes querying the server 104 to find a location of the electronic communication 116 in the mailbox index 108, and delivering a query vector or query matrix to the server 104 for isolating the electronic communication for delivery while protecting metadata surrounding the electronic communication.

Generally, the computing devices 102 and 114 may be configured as full resource devices with substantial memory and processor resources (e.g., personal computers, game consoles, or terminal computing devices), a mid-resource device with moderate memory and resources (e.g., a netbook), or a low-resource device with limited memory and/or processing resources (e.g., mobile devices, automobile computing devices, or wearable smart devices). The server 104 may be representative of one or a plurality of different devices, such as multiple servers utilized by a business to perform operations "over the cloud" as further described in relation to FIG. 9.

Figure 2:
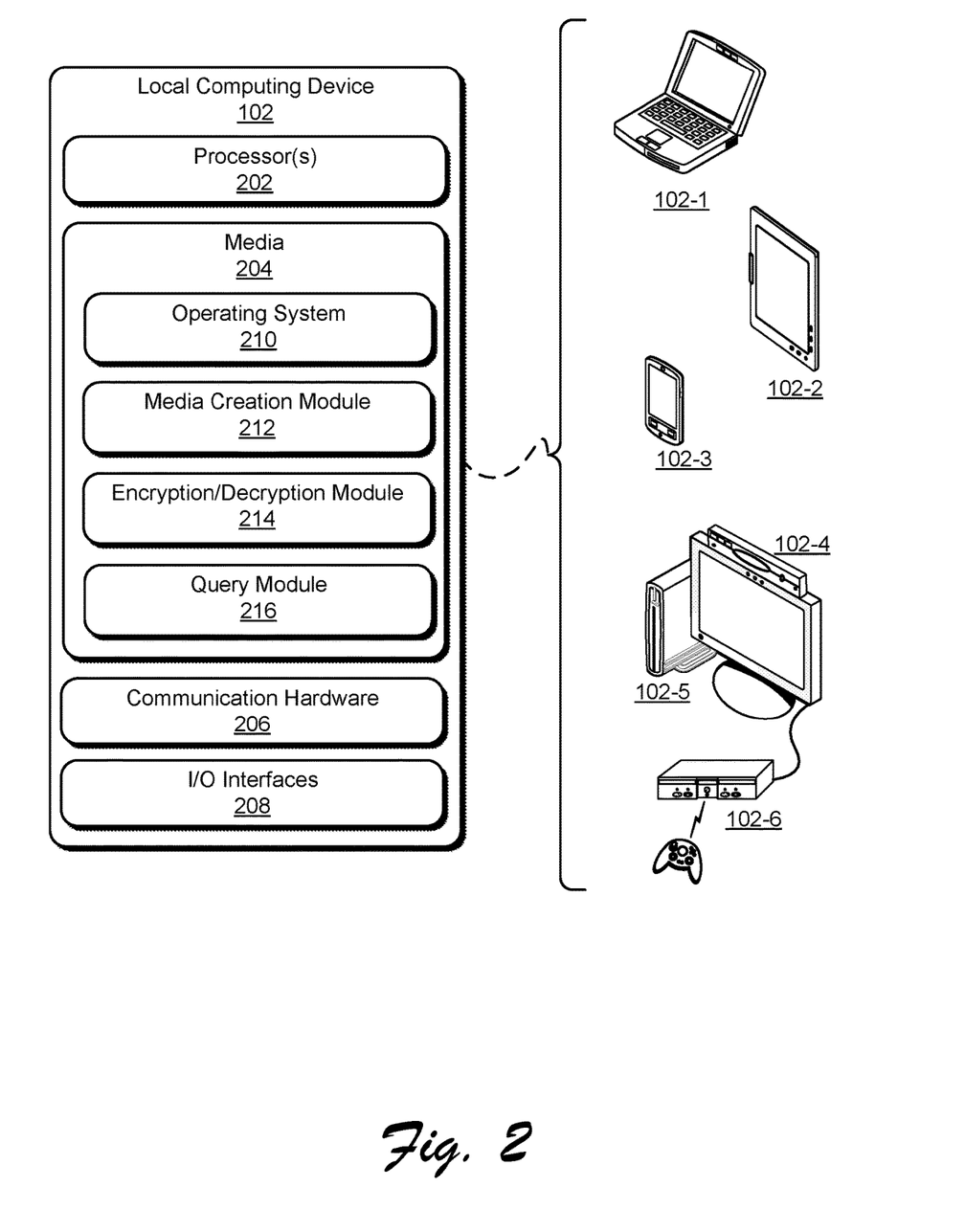
FIG. 2 is an illustration of an example computing device in accordance with one or more implementations.

FIG. 2 illustrates an example implementation of the computing device 102 of FIG. 1, which may also represent an example implementation of the computing device 114 of FIG. 1. The computing device 102 is illustrated with six example devices: a laptop computer 102-1, a tablet computer 102-2, a smart phone 102-3, a set-top box 102-4, a desktop computer 102-5, and a gaming device 102-6, though other computing devices and systems, such as wearable computing devices, servers, and netbooks, may also be used.

The computing device 102 includes or has access to computer processor(s) 202, computer-readable storage media ("media") 204, communication hardware 206, and I/O interfaces 208. Examples of the I/O interfaces 208 include a display, a touch sensitive input, a keyboard, a gaming remote, etc. The media 204 includes an operating system 210, media creation module 212, encryption/decryption module 214, and query module 216.

Generally, when sending electronic communication 116 by the computing device 102, a user may interact with I/O interfaces 208 to select or generate electronic media for sending. In at least some implementations, operating system 210 facilitates using media creation module 212 to create a message, document, drawing, presentation, spreadsheet or any other form or combination of electronic media for sending as a component of electronic communication 116. Alternatively, or additionally, operating system 210 facilitates choosing existing electronic media as part of electronic communication 116.

Once the electronic communication 116 is created or selected, it is encrypted using encryption/decryption module 214 and the label 118 is generated to identify the electronic communication 116. In at least some implementations, the encryption is performed using an encryption key that is generated based on a known secret shared between the computing device 102 and the computing device 114. To decrypt a message using the encryption/decryption module 214, the computing device 114 uses a decryption key corresponding to the encryption key. After encryption, content of the electronic communication 116 is considered secure. The computing device 102 then sends the encrypted electronic communication 116 to the server 104 with the label 118. According to various implementations, the electronic communication 116 is sent to the server 104 with the label 118 instead of identifying a particular recipient. Accordingly, metadata surrounding the electronic communication along with the electronic communication itself are protected from the server 104, including metadata relating to identification of a receiver.

Figure 3:
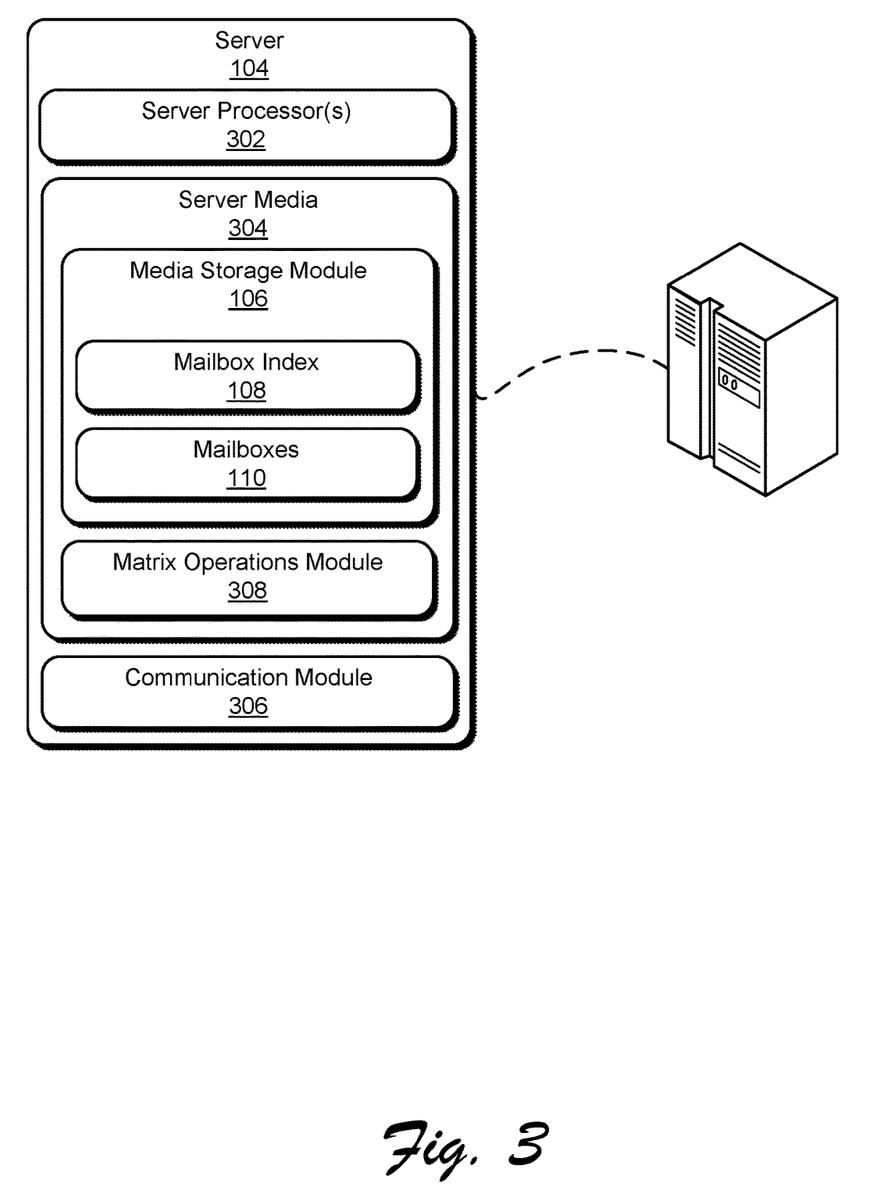
FIG. 3 is an illustration of an example server in accordance with one or more implementations.

FIG. 3 illustrates an example implementation of the server 104 in further detail. The server 104 is shown as a singular entity for visual brevity, though multiple devices may instead be used. The server 104 includes or has to access to server processor(s) 302, computer-readable storage media ("server media") 304, and a communications module 306. Server media 304 includes or has access to a media storage module 106 and a matrix operations module 308, and the media storage module includes a mailbox index 108 and mailboxes 110. The matrix operations module 308 performs matrix operations such as matrix multiplication and dot product computations for matrices such as a query matrix or query vector and the mailbox index 108.

Figure 4:
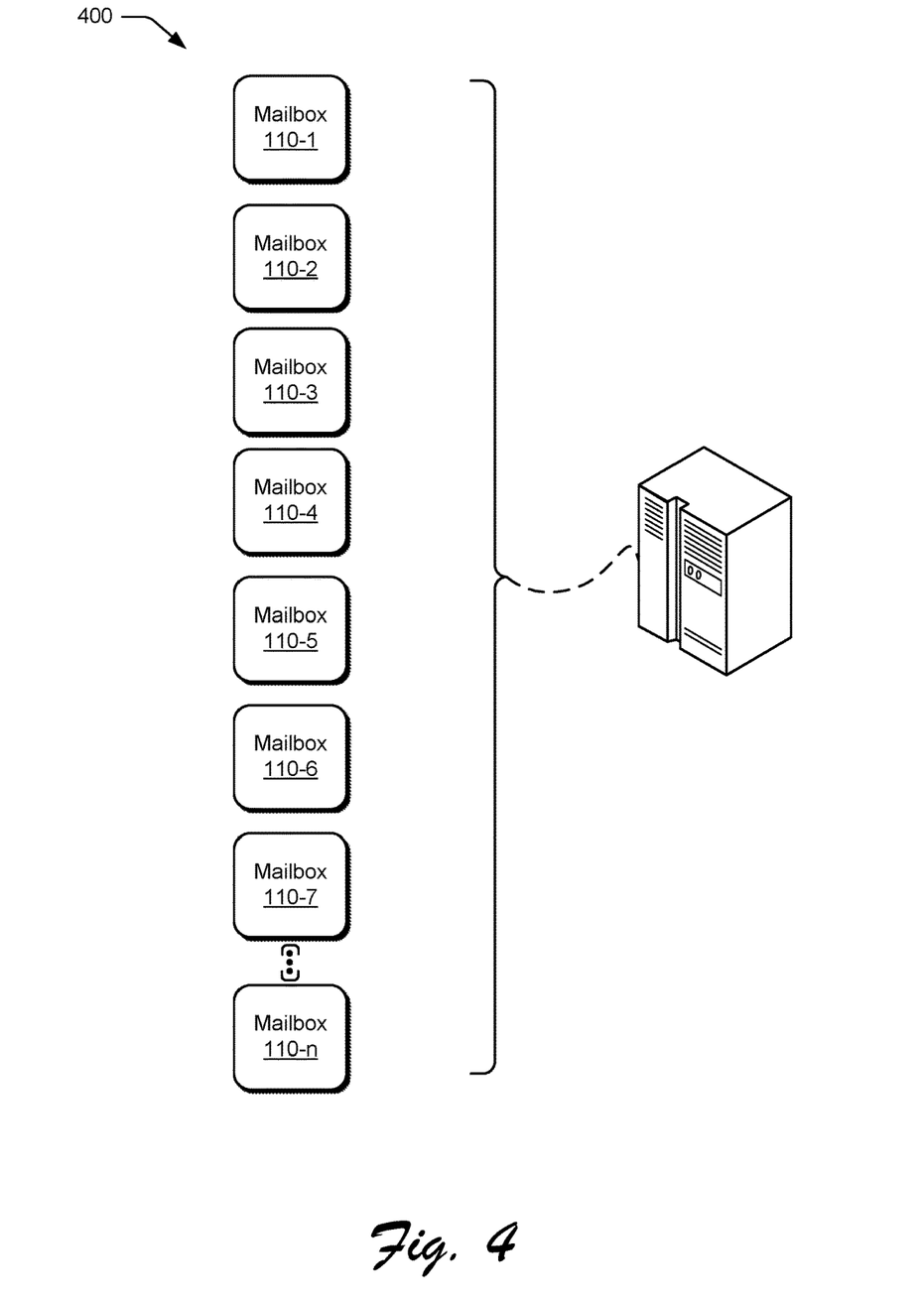
FIG. 4 is an illustration of an example mailbox indexing scheme in accordance with one or more implementations.
Figure 5:
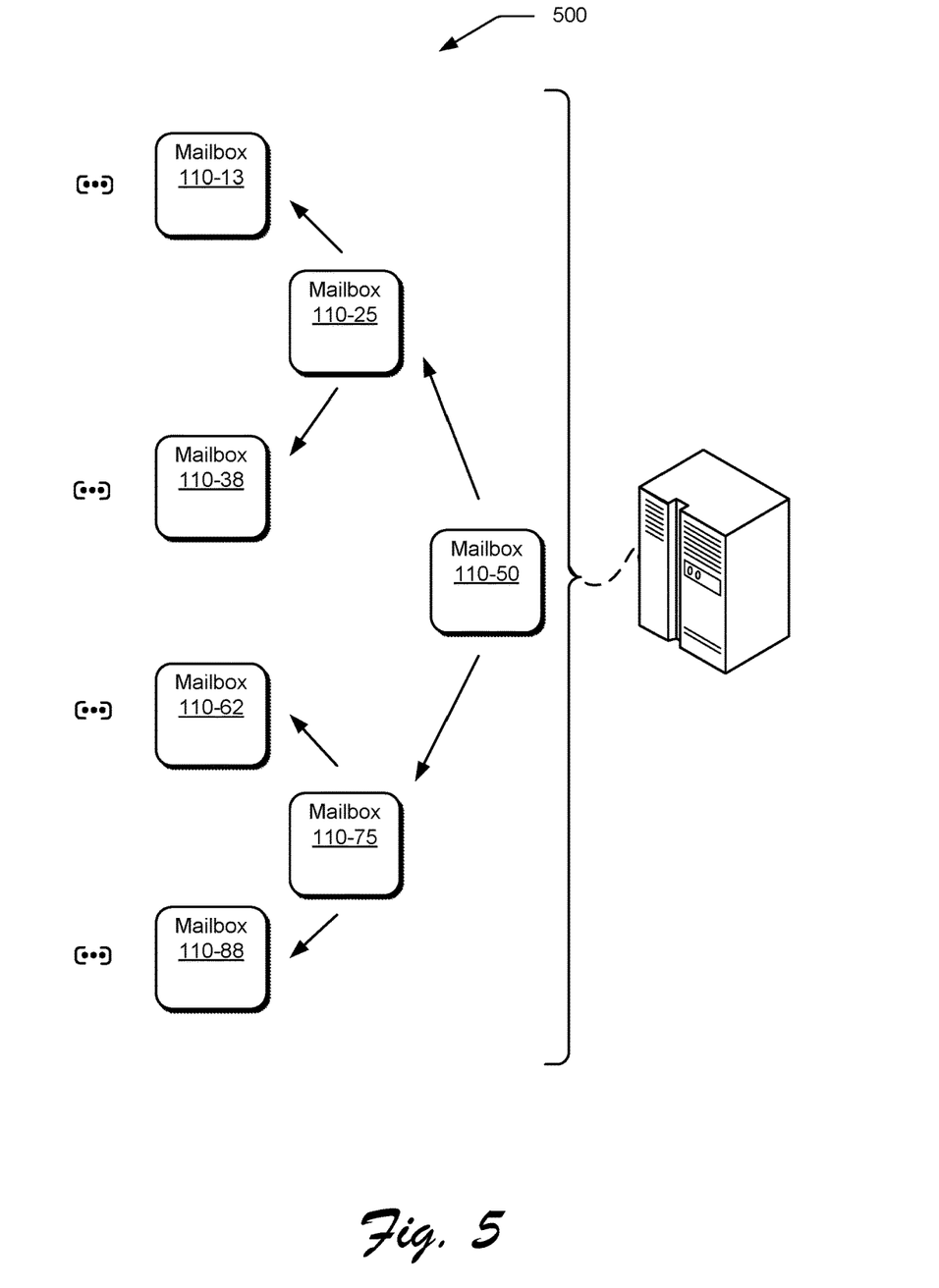
FIG. 5 is an illustration of an example mailbox indexing scheme in accordance with one or more implementations.
Figure 6:
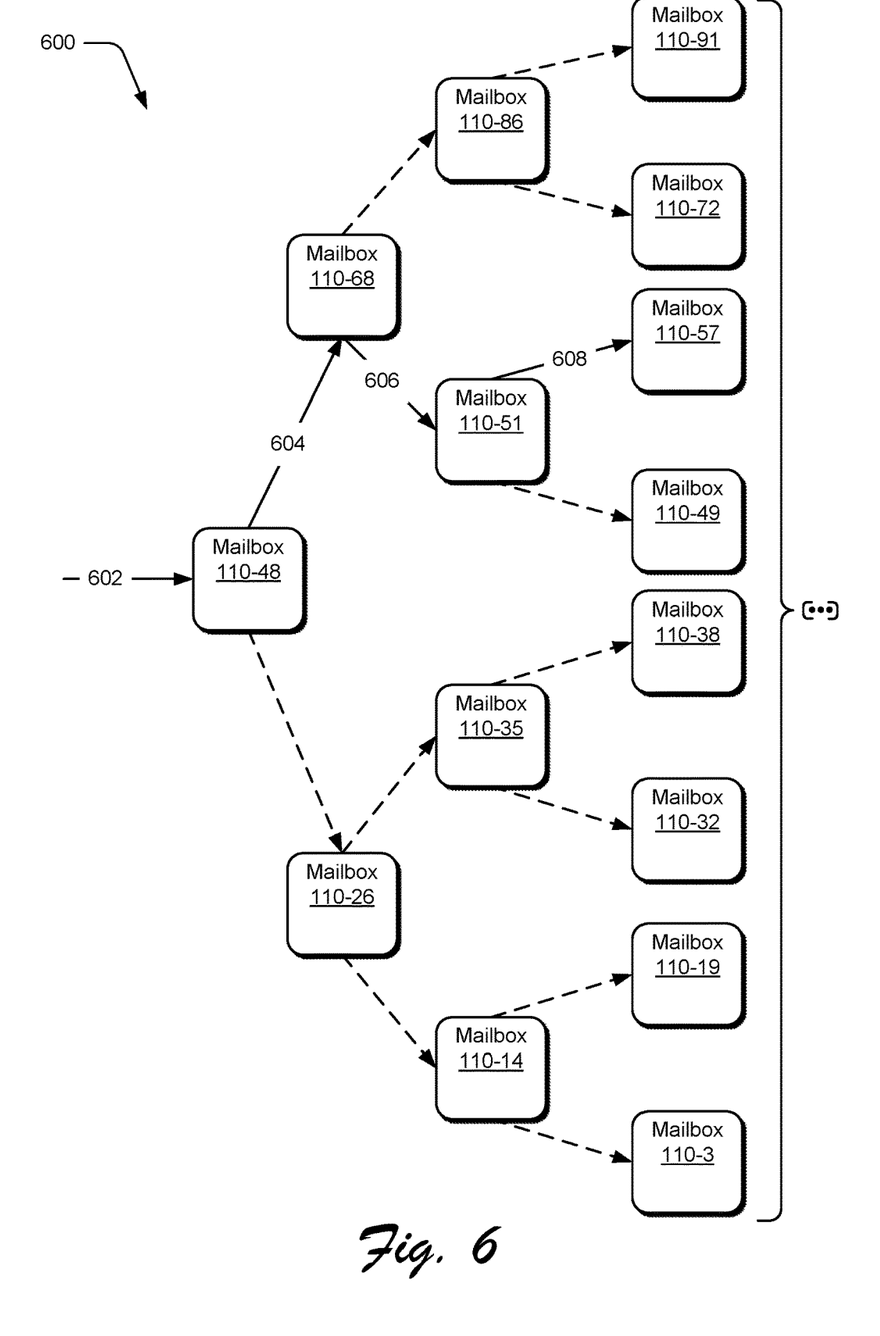
FIG. 6 is an illustration of an example query to locate a targeted mailbox in accordance with one or more implementations.

In general, when the server 104 receives the electronic communication 116 from the computing device 102, the electronic communication 116 is deposited by media storage module 106 into a target mailbox identified by the label 118 along with a plurality of other mailboxes 110 identified by their respective labels. The mailbox index 108 is generated to provide an index of mailboxes 110 stored on the server 104 including the target mailbox. The mailbox index 108 orders the mailboxes 110 by their respective label, examples of which are illustrated in FIGS. 4-6. As shown in FIGS. 5, 6, some implementations of the mailbox index 108 order the mailboxes 110 into a hierarchal structure such as a binary search tree wherein levels of the hierarchal data structure can be queried independently.

Returning again to the computing device 102 of FIG. 2 as an example illustration of the computing device 114, the computing device 114 sends the query 120 using query module 216 and communication hardware 206 via the network 112 to the server 104. The server 104 receives the query 120 via the communication module 306. A first component of the query 120 is used to locate the first mailbox in the media storage module 106. To accomplish this, the first component of the query 120 may include a request for the entire mailbox index 108 and search for the mailbox in the mailbox index 108 by the label 118.

Alternatively, the first component of the query 120 may include a series of probes to locate a target mailbox in the mailbox index 108. Generally, a probe involves choosing a location of the index as an initial "guess," privately retrieving a label at that location (without revealing to the server which label was retrieved), and refining the guess for a following probe until a target mailbox is located. A probe process, for instance, represents a search algorithm that searches using a label to locate a target mailbox. In some implementations, after the target mailbox has been located, the query will continue to dummy probe the mailbox index 108 to hide that the query was searching for the target mailbox. In implementations where the mailbox index 108 is organized into a hierarchal structure, for example, the first component of the query 120 may include a request for the highest levels of the hierarchal structure for more efficient probing.

After locating the target mailbox in the mailbox index 108, the computing device 114 generates a second component of the query 120, a query vector, using the query module 216. The query vector is configured such that, after performing a dot product with the mailbox index 108, unwanted content from the rest of mailboxes 110 (the untargeted mailboxes) is filtered away and only contents of the first mailbox remain. This can be accomplished by encoding a value of 1 as an entry of the query vector to be multiplied with the entry of the first mailbox in the mailbox index 108 when a dot product of the query vector and the mailbox index 108 is performed. Entries of the query vector to be multiplied with entries of untargeted mailboxes are encoded to 0, resulting in filtering away content of the untargeted mailboxes, without the server being aware of the identity of the target mailbox.

For simplicity, an implementation using a query vector is discussed, but a query matrix may be substituted for a query vector with matrix multiplication substituted for a dot product. The first component of the query 120 may be referred to as the query and the second component of the query 120 may be referred to as the query vector or query matrix. As discussed above, the query matrix may be in the form of a query vector and is configured such that, after performing matrix multiplication with the mailbox index 108, unwanted content from the rest of mailboxes 110 are filtered away and only contents of the first mailbox remain.

The computing device 114 sends the query vector to the server 104 via the network 112. The server 104 then carries out matrix operations using the matrix operations module 308 to perform a dot product of the query vector and a matrix representation of the mailbox index 110 by multiplying the encrypted entries of the query vector with corresponding entries of the mailboxes index 110. The result of the matrix operations, including the electronic communication 116, are sent via communications module 306 to the computing device 114 via the network 112.

Thus, the first computing device 102 may send the electronic communication 116 to the second computing device 114 while protect metadata surrounding the electronic communication 116. The metadata, for instance, relates to identification of a relationship between the sending computing device 102 and the receiving computing device 114.

FIG. 4 illustrates an example implementation 400 of mailboxes 110 being organized into a simple, single layer list as the mailbox index 108. Mailboxes 110 are shown having example mailboxes 110-1, 110-2, 110-3, 110-4, 110-5, 110-6, 110-7, and 110-n. Using a single layer list as the mailbox index 108, a query may locate a target mailbox by generating a series of probes. For example, if a target mailbox has a label of 3, a first probe may be directed at mailbox 110-5 and return a label of 5. Because the returned label is higher than the label of the target mailbox, a second probe might be directed at mailbox 110-4 and return a label of 4. Because returned label is still higher than the label of the target mailbox, a third probe may be directed at mailbox 110-3 and return a label of 3. Because this is the label of the target mailbox, the query has located an indexed location of the target mailbox. The query may continue probing additional mailboxes, e.g., 110-2 and 110-1, to obfuscate that the query was searching for mailbox 110-3. A quantity of probes may be equal to a quantity of levels of the binary search tree to obfuscate an identity of the targeted mailbox.

FIG. 5 illustrates an example implementation 500 of mailboxes 110 being organized into a binary search tree hierarchal structure with the highest levels of the binary search tree including mailboxes 110-50, 110-25, 110-75, 110-13, 110-38, 110-62, and 110-88. The media storage module 106, for example, is storing approximately one hundred mailboxes 110. In this implementation, each level of the binary search tree is populated with a mailbox label to improve efficiency of the query 120. The first level of the binary search tree, mailbox 110-50, has a label that is generally near the median of the mailboxes 110. A first probe may determine that the highest level of the binary search tree is a mailbox having a label of 50. If the query 120 is searching for a mailbox that is alphanumerically lower than 50, the next probe will target the second level of the binary search tree that is lower than 50, mailbox 110-25. Alternatively, if the query 120 is searching for a mailbox that is alphanumerically higher than 50, the next probe will target the second level of the binary search tree that is higher than 50, mailbox 110-75. Probing will continue until the first mailbox is located. To better hide the identity of the targeted first mailbox, query 120 may continue probing after the first mailbox is located. For instance, the query 120 is configured to continue probing until the last level of the binary search tree to obfuscate that the target mailbox has already been located.

In some implementations, the query may request a plurality of highest levels of the binary search tree and choose to begin probing at one of mailbox 110-13, 110-38, 110-62, or 110-88. In the illustrated implementation, requesting the illustrated highest levels of the binary search tree may increase efficiency and lower computing costs by replacing two probe iterations. In some implementations, the highest levels of the binary search tree may be defined as a predetermined quantity of highest levels of the binary search tree. In other implementations, the highest levels of the binary search tree may be defined as a predetermined percentage of highest levels of the binary search tree.

FIG. 6 illustrates an example implementation 600 of a query 120 comprising a series of probes to sequentially process a plurality of levels of a binary search tree to locate an indexed location of a target mailbox having a label 110-57. As illustrated, the query 120 generates a series of probes, beginning with a first probe 602 to determine that the highest level of the binary search tree has label 110-48. Because target mailbox label 110-57 is alphanumerically higher than label 110-48, a second probe 604 is generated to target the second level of the binary search tree that is higher than label 110-48 and locates mailbox 110-68. Because label 110-57 is alphanumerically lower than label 110-68, a third probe 606 is generated to target the third level of the binary search tree that is lower than label 110-68 and locates mailbox 110-51. Using the same process, a fourth probe 608 is generated to target the fourth level of the binary search tree that is higher than mailbox 110-51 and locates the target mailbox, mailbox 110-57. Once the target mailbox is located, its indexed location is used to generate a query vector to isolate content of the target mailbox, as discussed herein. As discussed above, the query may continue to probe the binary search tree to obfuscate that the query was searching for the target mailbox.

Example Methods

The following discussion describes methods for electronically communicating while maintaining privacy of associated metadata. Aspects of each of the methods may be implemented in hardware, firmware, or software, or a combination thereof. The methods are shown as a set of blocks that specify operations performed by one or more devices and are not necessarily limited to the orders shown for performing the operations by the respective blocks. In portions of the following discussion, reference will be made to FIGS. 1-3.

Figure 7:
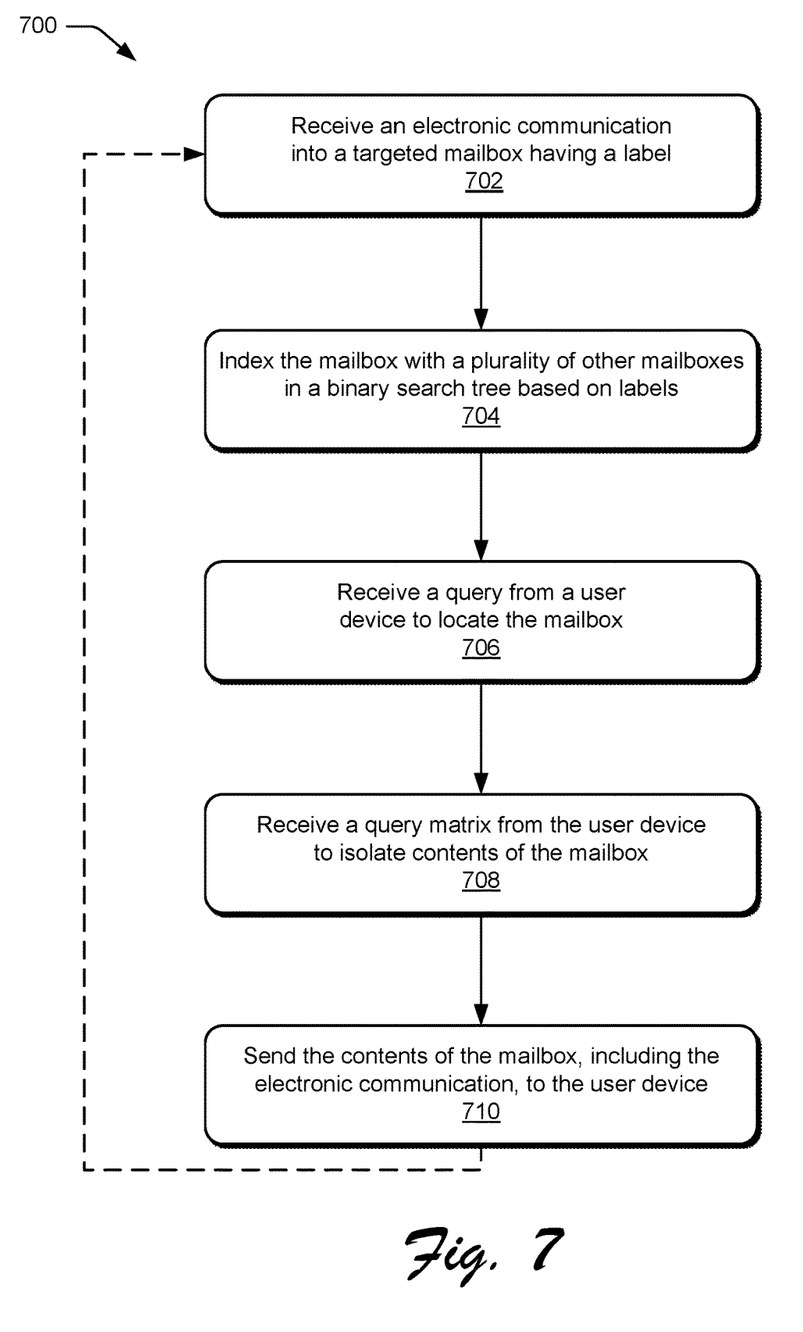
FIG. 7 is a flow diagram that describes operations in a method in accordance with one or more implementations.

FIG. 7 depicts method 700 in an example implementation in which a server facilitates sending of electronic communication while maintaining privacy of associated metadata. By doing so, users are able to freely communicate while reducing the likelihood that metadata, including relationships between user devices, is discoverable by hostile or other unauthorized parties.

At operation 702, an electronic communication is received into a target mailbox having a label. The server 104, for instance, receives the electronic communication 116 into a mailbox of media storage module 106. In some implementations, a specified interval of time is defined as a receive phase in which electronic communications may be received by the server 104.

At operation 704, the mailbox is indexed with a plurality of other mailboxes in a binary search tree based on labels. For example, the server 104 indexes the target mailbox with a plurality of other mailboxes 110 stored in media storage module 106 of the server 104. In some implementations, indexing of mailboxes may be performed continuously in response to receiving communications. Alternatively, indexing may be performed after conclusion of a receive phase.

At operation 706 a query is received from a user device to locate the mailbox. The server 104, for instance, receives the query 120 to locate the target mailbox from a user device such as the computing device 114. The query 120 may include a series of probes to locate the target mailbox based on the label in the mailbox index 108. The series of probes may include directing a probe at an indexed location of the mailbox index 108 based on a label found during a previous probe.

At operation 708, a query matrix is received from the user device to isolate contents of the mailbox. The contents of the mailbox, including the electronic communication, are isolated while protecting metadata of the electronic communication. For example, the server 104 receives a query matrix (and/or query vector) of encrypted entries from the user device to isolate contents of the target mailbox and filter away contents of other mailboxes based on the location of the target mailbox. The query matrix, for example, is configured with encrypted entries that encrypt to zero at all entries except for a location corresponding to the location of the target mailbox such that when matrix multiplication of the query matrix and the index of the plurality of mailboxes is performed, content of all mailboxes but the targeted mailbox is filtered. The query matrix may be a vector such as a column vector or a row vector.

At operation 710, the contents of the mailbox, including the electronic communication, are sent to the user device. For instance, the server 104 sends the contents of the target mailbox, including the electronic communication 116, to the user device while maintaining privacy of associated metadata. To isolate contents of the target mailbox for sending, the server 104, using the matrix operations module 308, performs matrix multiplication of the query matrix and the mailbox index 108. In some implementations, sending of electronic communications is performed at predefined intervals of time.

As illustrated, operations 702-710 may be repeated. In some implementations, the server 104 is set to repeat method 700 on predetermined intervals. The server 104 may solicit electronic communications from user devices at repeated operation 702 and solicit a query and query matrix from a user device in repeated operations 706 and 708. In some implementations, the computing device 102 may send a dummy message including a meaningless encrypted electronic communication, or an encrypted electronic message with a random label, in response to being solicited for an electronic communication when the computing device 102 does not have a genuine electronic message to send.

Figure 8:
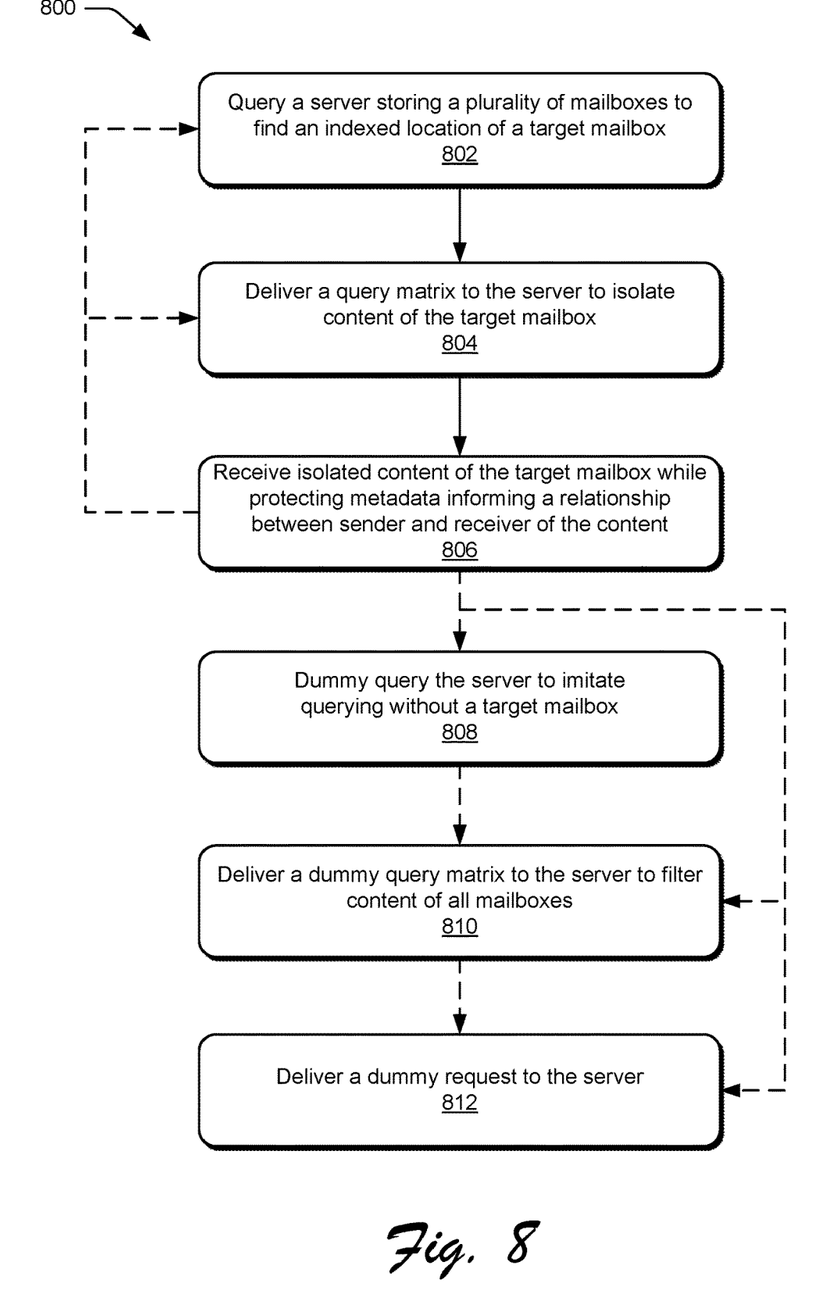
FIG. 8 is a flow diagram that describes operations in a method in accordance with one or more implementations.

FIG. 8 depicts method 800 in an example implementation in which a computing device queries for and receives an electronic communication. The computing device 114, for instance, retrieves the electronic communication 116 without the server 104 being aware of metadata associated with the delivery of the electronic communication 116 from the computing device 102 to the computing device 114.

At operation 802, a server storing a plurality of mailboxes in a mailbox index is queried to find an indexed location of a targeted mailbox. For example, the computing device 114 queries the server 104 to find an indexed location of a target mailbox based on its label using a series of probes, and/or a request for a portion, of a mailbox index 108 stored by the server 104. The query identified in operation 802 is sometimes referenced herein as a first component of the query. In some implementations, the server 104 is configured to facilitate efficient querying by indexing a plurality of mailboxes 110 into a binary search tree such as shown in FIGS. 5 and 6.

At operation 804 a query matrix is delivered to the server to isolate content of the targeted mailbox without the server identifying the targeted mailbox as the source of the content. The computing device 114, for instance, delivers a query matrix to the server 104 to isolate content of the targeted mailbox from untargeted mailboxes 110. The query matrix is configured with encrypted entries that encrypt to zero at all entries except for a location corresponding to the location of the target mailbox such that when matrix multiplication of the query vector and the index of the plurality of mailboxes is performed, content of all mailboxes but the targeted mailbox is filtered. The query matrix may be a vector such as a column vector or a row vector and the index of the plurality of mailboxes may be expressed as a row vector or a column vector. At operation 806, isolated content of the target mailbox is received while protecting metadata informing a relationship between sender and receiver of the content. The computing device 114, for instance, receives content from the server 104 that remains after filtering content from untargeted mailboxes 110, including content of the target mailbox. As illustrated, operations 802-806 may be repeated, for example, after a predetermined interval.

At operation 808, the server is dummy queried to imitate querying without a target mailbox. The computing device 114 for instance dummy queries the server 104 to imitate querying without a targeted mailbox. Dummy querying may include probing without looking for a particular mailbox in the mailbox index 108 and may be in response to being solicited for a query by the server 104. In some implementations, the computing device 114 delivers a query to the server 104 on a predetermined interval during a receive phase, and when the computing device does not target any mailboxes stored on the server 104, the computing device delivers a dummy query.

At operation 810, a dummy query matrix is delivered to the server to filter content of all mailboxes. The computing device 114, for example, delivers a dummy query matrix to filter content of all mailboxes 110. The dummy query matrix may include all entries encrypting to 0, such that when matrix operations module 308 performs matrix multiplication of the dummy matrix with the mailbox index 108, no mailbox content remains. At operation 812, a dummy request is delivered to the server for a result of a dot product of the dummy query matrix and the mailbox index. For example, the computing device 114 delivers a dummy request to the server 104 for content that has been filtered of all mailbox content. Operations 808-812 may be performed after a predetermined interval to obfuscate identification of target mailboxes.

Thus techniques for secure electronic communication described herein facilitate securely exchanging electronic communications while protecting metadata surrounding the electronic communications. The metadata is protected by obfuscating a connection between a sender of electronic communication and a recipient of the electronic communication, thus protecting a relationship between communicating parties.

Example System and Device

Figure 9:
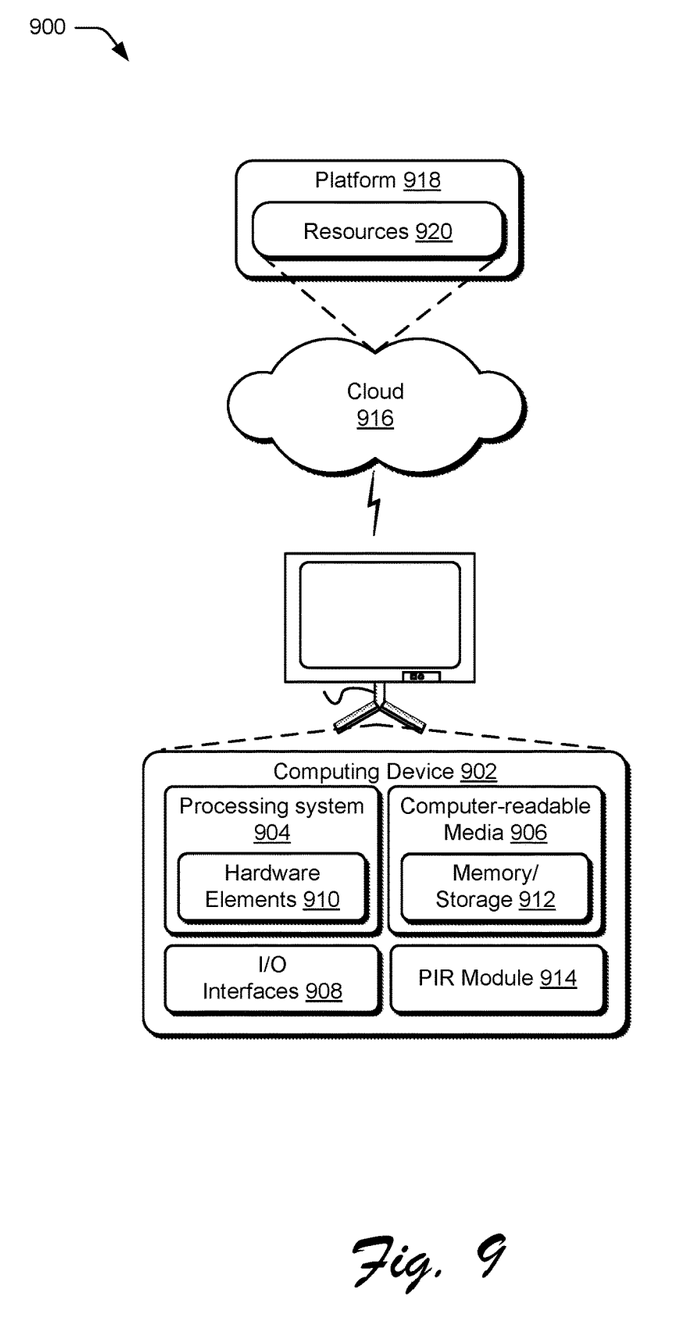
FIG. 9 illustrates an example system including various components of an example device that can be implemented as any type of computing device as described and/or utilized with reference to FIGS. 1-8 to implement aspects of the techniques described herein.

FIG. 9 illustrates an example system generally at 900 that includes an example computing device 902, which is representative of one or more computing systems and/or devices that may implement the various techniques described herein. This is illustrated through inclusion of private information retrieval ("PIR") module 914, which may be configured to implement one or more operations performed by the computing device 102, the server 104 or the computing device 114 relating to the computing device 102 securely sending the electronic communication 116 to the computing device 114 without the server 104 being aware of the contents of the electronic communication 116 or being aware of a communication relationship of the computing device 102 and the computing device 114 as discussed herein. For example, PIR module 914 may be representative of the encryption/decryption module 214, the query module 216, the mailbox index 108, or the matrix operations module 308.

The computing device 902 may be, for example, a server of a service provider, a device associated with a client (e.g., a client device), an on-chip system, and/or any other suitable computing device or computing system.

The computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 904 is representative of functionality to perform one or more operations using hardware. Accordingly, processing system 904 is illustrated as including hardware elements 910, which may be configured as processors, functional blocks, and so forth. This may include implementation in hardware as an application-specific integrated circuit or other logic device formed using one or more semiconductors. Hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 906 is illustrated as including memory/storage 912. Memory/storage 912 represents memory/storage capacity associated with one or more computer-readable media. Memory/storage 912 may include volatile media (such as random access memory (RAM)) and/or nonvolatile media (such as read only memory (ROM), Flash memory, optical disks, magnetic disks, and so forth). Memory/storage 912 may include fixed media (e.g., RAM, ROM, a fixed hard drive, and so on) as well as removable media (e.g., Flash memory, a removable hard drive, an optical disc, and so forth). Computer-readable media 906 may be configured in a variety of other ways as further described below.

Input/output interfaces 908 are representative of functionality to allow a user to enter commands and information to the computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The entities described herein (e.g., PIR module 914) generally represent software, firmware, hardware, or a combination thereof. The features of the techniques described herein are platform-independent, meaning that the techniques may be implemented on a variety of commercial computing platforms having a variety of processors.

An implementation of the described entities and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 916 via a platform 918 as described below.

Cloud 916 includes and/or is representative of platform 818 for resources 920. Platform 818 abstracts underlying functionality of hardware (e.g., servers) and software resources of cloud 916. Resources 920 may include applications and/or data that can be utilized while computer processing is executed on servers that are remote from the computing device 902. Resources 920 can also include services provided over the Internet and/or through a subscriber network, such as a cellular or Wi-Fi network.

Platform 918 may abstract resources and functions to connect The computing device 902 with other computing devices. Platform 918 may also serve to abstract scaling of resources to provide a corresponding level of scale to encountered demand for resources 920 that are implemented via platform 918. Accordingly, in an interconnected device implementation, implementation of functionality described herein may be distributed throughout system 900. For example, the functionality may be implemented in part on the computing device 902 as well as via platform 816 that abstracts the functionality of cloud 914.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for protecting an electronic communication between a sending device and a receiving device over a server, the system comprising: at least one processor; at least one computer-readable storage medium storing instructions that are executable by the at least one processor to perform operations including: receiving the electronic communication from the sending device in a target mailbox having a label at an indexed location of media storage including a plurality of mailboxes; receiving a query from the receiving device to locate the indexed location of the target mailbox in the data store based on the label; receiving a query matrix of encrypted entries from the receiving device, the query matrix having encrypted entries to isolate contents of the target mailbox from other mailboxes of the plurality of mailboxes; and sending contents of the target mailbox including the electronic communication to the receiving device.

Alternatively or in addition to any of the above described systems, any one or combination of: wherein the query matrix is one of a column vector or a row vector, a matrix representation of the index of the plurality of mailboxes is the other of a column vector or a row vector, and the contents of the target mailbox are isolated by performing a dot product of the query matrix and the matrix representation of the index of the plurality of mailboxes; wherein the plurality of mailboxes is indexed according to alphanumerical ordering; wherein the plurality of mailboxes is indexed into a hierarchical data structure, and wherein levels of the hierarchical data structure are independently queryable; wherein the query comprises a series of probes to sequentially process a plurality of levels of the hierarchical data structure to locate the indexed location of the target mailbox; wherein the operations further comprise, prior to sending the contents of the target mailbox, delivering labels of a plurality of levels of the hierarchal data structure to the receiving device; wherein the label is derived from a known secret shared between the sending device and the receiving device prior to assigning the label to the target mailbox; wherein the server is untrusted and metadata of the electronic communication is protected from the server; wherein the data store is indexed after conclusion of a receive phase during which the electronic communication is received.

A method for secure electronic communication, the method comprising: querying, by a computing device, a server to find an indexed location of a target mailbox based on a label of the target mailbox; delivering to the server, by the computing device, a query matrix of entries encrypted to isolate content of the target mailbox from the plurality of mailboxes; and receiving, by the computing device, isolated content of the target mailbox.

Alternatively or in addition to any of the above described methods, any one or combination of: the method further comprising, after a predetermined interval: dummy querying the server, the dummy query imitating querying without a target mailbox; delivering, to the server, a dummy query matrix of entries encrypted to 0 at all entries; delivering a dummy request for a result of a dot product of the dummy query matrix and the mailbox index; wherein the isolated content of the target mailbox comprises an electronic communication, and the electronic communication is received without the server knowing which electronic communication was received; wherein the querying comprises a series of probes corresponding to levels of a binary search tree data structure; wherein a quantity of probes equals a quantity of levels of the binary search tree data structure to obfuscate an identity of the target mailbox; wherein one or more of querying, delivering, and requesting are repeated on a predetermined interval.

A method for secure electronic communication between a sending device and a receiving device over one or more untrusted servers, the method comprising: indexing a plurality of mailboxes by respective mailbox labels within a binary search tree of a data store, the plurality of mailboxes for storing electronic communications; storing an electronic communication received from the sending device in a target mailbox identified by a target mailbox label; receiving a query from the receiving device, the query including a series of probes of the binary search tree to locate an indexed location of the target mailbox by the target mailbox label, and a query vector to isolate the content of the target mailbox from content of the plurality of mailboxes based on the indexed location; and sending content of the target mailbox including the electronic communication to the receiving device Alternatively or in addition to any of the above described methods, any one or combination of: the method further comprising, prior to sending, delivering mailbox labels of a plurality of levels of the binary search tree to the receiving device; wherein the series of probes comprises dummy probes made after locating the target mailbox; wherein receiving a query and sending are performed according to a private information retrieval scheme; wherein the query vector further comprises encrypted entries such that at a location of the target mailbox, the entries encrypt to 1 and at one or more other locations, the entries encrypt to 0.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

CONCLUSION

Although the implementations have been described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:
1. A system for protecting an electronic communication between a sending device and a receiving device over an electronic mailbox server that manages a plurality of mailboxes, the system comprising:
   at least one processor;
   at least one computer-readable storage media storing instructions that are executable by the at least one processor to perform operations including:
   receiving, at the electronic mailbox server, the electronic communication from the sending device, wherein contents of the electronic communication are encrypted;
   identifying a label for routing the electronic communication to a target mailbox of the plurality of mailboxes, wherein the label is created at a time when the electronic communication is encrypted;

receiving a query from the receiving device to locate an indexed location of the target mailbox based on the label;

receiving a query matrix of encrypted entries from the receiving device, the query matrix having encrypted entries to isolate contents of the target mailbox from other mailboxes of the plurality of mailboxes; and sending contents of the target mailbox including the electronic communication to the receiving device.

2. A method as in claim 1, wherein the query matrix is one of a column vector or a row vector, a matrix representation of an index of the plurality of mailboxes is the other one of the column vector or the row vector, and the contents of the target mailbox are isolated by performing a dot product of the query matrix and the matrix representation of the index of the plurality of mailboxes.

3. A method as in claim 1, wherein the plurality of mailboxes is indexed according to alphanumerical ordering.

4. A method as in claim 1, wherein the plurality of mailboxes is indexed into a hierarchical data structure, and wherein levels of the hierarchical data structure are independently queryable.

5. A method as in claim 4, wherein the query comprises a series of probes to sequentially process a plurality of levels of the hierarchical data structure to locate the indexed location of the target mailbox.

6. A method as in claim 4, wherein the operations further comprise, prior to sending the contents of the target mailbox, delivering labels of a plurality of levels of the hierarchal data structure to the receiving device.

7. A method as in claim 1, wherein the label is derived from a known secret shared between the sending device and the receiving device prior to assigning the label to the target mailbox.

8. A method as in claim 1, wherein the electronic mailbox server is untrusted and metadata of the electronic communication is protected from the electronic mailbox server.

9. A method as in claim 1, wherein the plurality of mailboxes is indexed after conclusion of a receive phase during which the electronic communication is received.

10. A method for secure electronic communication, the method comprising:
  querying, by a computing device, an electronic mailbox server that manages a plurality of mailboxes to find an indexed location of a target mailbox based on a label of the target mailbox;
  delivering to the electronic mailbox server, by the computing device, a query matrix of entries encrypted to isolate content of the target mailbox from the plurality of mailboxes; and
  receiving, by the computing device, isolated content of the target mailbox.

11. A method as in claim 10, further comprising, after a predetermined interval:
  dummy querying the electronic mailbox server, the dummy query imitating querying without the target mailbox;
  delivering, to the electronic mailbox server, a dummy query matrix of entries encrypted to 0 at all entries;
  delivering a dummy request for a result of a dot product of the dummy query matrix and a mailbox index.

12. A method as in claim 10, wherein the isolated content of the target mailbox comprises an electronic communication, and the electronic communication is received without the electronic mailbox server knowing which electronic communication was received.

13. A method as in claim 10, wherein the querying comprises a series of probes corresponding to levels of a binary search tree data structure.

14. A method as in claim 13, wherein a quantity of probes equals a quantity of levels of the binary search tree data structure to obfuscate an identity of the target mailbox.

15. A method as in claim 10, wherein one or more of querying, delivering, and requesting are repeated on a predetermined interval.

16. A method for secure electronic communication between a sending device and a receiving device over one or more untrusted servers, the method comprising:
  in an electronic mailbox server:
    indexing a plurality of mailboxes by respective mailbox labels within a binary search tree of a data store;
    receiving, from the sending device, an electronic communication, wherein contents of the electronic communication are encrypted;
    identifying a label for routing the electronic communication to a target mailbox of the plurality of mailboxes, wherein the label is created at a time when the electronic communication is encrypted;
    storing the electronic communication in the target mailbox identified by a target mailbox label;
    receiving a query from the receiving device, the query including a series of probes of the binary search tree to locate an indexed location of the target mailbox by the target mailbox label, and a query vector to isolate content of the target mailbox from content of the plurality of mailboxes based on the indexed location; and
    sending content of the target mailbox including the electronic communication to the receiving device.

17. A method as in claim 16, further comprising, prior to sending, delivering mailbox labels of a plurality of levels of the binary search tree to the receiving device.

18. A method as in claim 16, wherein the series of probes comprises dummy probes made after locating the target mailbox.

19. A system as in claim 16, wherein receiving the query and sending are performed according to a private information retrieval scheme.

20. A system as in claim 16, wherein the query vector further comprises encrypted entries such that at a location of the target mailbox, the entries encrypt to 1 and at one or more other locations, the entries encrypt to 0.

* * * * *